(12) United States Patent
Kauffman et al.

(10) Patent No.: US 10,358,726 B2
(45) Date of Patent: Jul. 23, 2019

(54) METHODS AND USE OF MANIPULATING AU25 CHARGE STATE

(71) Applicants: Douglas Kauffman, Pittsburgh, PA (US); Christopher Matranga, Pittsburgh, PA (US); Dominic Alfonso, Pittsburgh, PA (US); Paul Ohodnicki, Allison Park, PA (US); Xingyi Deng, Pittsburgh, PA (US); Rajan C. Siva, Chennai (IN); Chenjie Zeng, Pittsburgh, PA (US); Rongchao Jin, Pittsburgh, PA (US)

(72) Inventors: Douglas Kauffman, Pittsburgh, PA (US); Christopher Matranga, Pittsburgh, PA (US); Dominic Alfonso, Pittsburgh, PA (US); Paul Ohodnicki, Allison Park, PA (US); Xingyi Deng, Pittsburgh, PA (US); Rajan C. Siva, Chennai (IN); Chenjie Zeng, Pittsburgh, PA (US); Rongchao Jin, Pittsburgh, PA (US)

(73) Assignee: U.S. Department of Energy, Washington, DC (US)

(*) Notice: Subject to any disclaimer, the term of this patent is extended or adjusted under 35 U.S.C. 154(b) by 608 days.

(21) Appl. No.: 14/573,080

(22) Filed: Dec. 17, 2014

(65) Prior Publication Data

US 2015/0167187 A1    Jun. 18, 2015

Related U.S. Application Data

(60) Provisional application No. 61/917,387, filed on Dec. 18, 2013.

(51) Int. Cl.
*C25B 11/04* (2006.01)
*B01J 23/52* (2006.01)
(Continued)

(52) U.S. Cl.
CPC .......... *C25B 11/0447* (2013.01); *B01J 23/52* (2013.01); *B01J 35/002* (2013.01); *B01J 35/006* (2013.01); *B01J 35/0013* (2013.01); *B01J 35/0033* (2013.01); *B01J 37/035* (2013.01); *B01J 37/345* (2013.01); *C25B 11/0415* (2013.01); *C25B 11/0473* (2013.01); *B01J 35/004* (2013.01);
(Continued)

(58) Field of Classification Search
None
See application file for complete search history.

(56) References Cited

PUBLICATIONS

Qian et al. J. Phys. Chem. C 2010, 114, 19935-19940.*
Kauffman et al. The Journal of Physical Chemistry Letters, 2013, 4, 195-202, published on Dec. 19, 2012.*

* cited by examiner

*Primary Examiner* — Yun Qian
(74) *Attorney, Agent, or Firm* — Timothy L. Harney; Jacob A. Heafner; Brian J. Lally

(57) ABSTRACT

Methods for manipulating charge states of Au nanoparticles and uses for the corresponding nanoparticles are described. A preferred embodiment comprises the following steps: 1) combining at least one Au nanocluster with at least one electron accepting molecule in the presence of an excess amount of counter ion; and 2) exposing the nanocluster, electron acceptor and counter ion mixture to light creating $Au^+$ nanoclusters. In one or more embodiments, an additional step of depositing the $Au^+$ nanoclusters onto a catalyst support is performed.

19 Claims, 11 Drawing Sheets

(51) Int. Cl.
*B01J 37/03* (2006.01)
*B01J 37/34* (2006.01)
*B01J 35/00* (2006.01)
B22F 1/00 (2006.01)
B01J 37/02 (2006.01)

(52) U.S. Cl.
CPC ........ *B01J 37/0203* (2013.01); *B01J 37/0211* (2013.01); *B22F 1/0018* (2013.01)

(a)

(b) $Au_{25}(SC_2H_4Ph)_{18}^-$ with Tetraoctylammonium (TOA$^+$) Counter Ion (c) $Au_{25}(SC_2H_4Ph)_{18}^-$ Spacefill Model

METHODS AND USE OF MANIPULATING AU25 CHARGE STATE

RELATED APPLICATIONS

The present application claims the benefit of priority of U.S. Provisional Patent Application No. 61/917,387, filed on Dec. 18, 2013, and entitled "CONTROLLING AU25 CHARGE STATE FOR IMPROVED CATALYTIC ACTIVITY," which is herein incorporated in its entirety.

GOVERNMENT RIGHTS

The United States Government has rights in this invention pursuant to the employer-employee relationship between the Government and one or more of the inventors who are U.S. Department of Energy employees at the National Energy Technology Laboratory, Pittsburgh, Pa.

FIELD OF THE INVENTION

One or more embodiments consistent with the present disclosure relate to methods for the control of nanoparticle charge state and methods for the use of those nanoparticles.

BACKGROUND

Charged $Au^{+/0/-}$ species have been proposed as reaction centers for reduction and oxidation of organic molecules. The charged active sites of various $Au^{+/0/-}$ species are thought to play a key role in the oxidation of CO and styrene, the hydrogenation of ketones and aldehydes, as well as the reduction of $CO_2$ and $O_2$. Anionic, neutral and cationic Au species have all shown electrocatalytic activity towards $CO_2$ reduction, CO oxidation and $O_2$ reduction reactions. In order for rational catalyst design, active site composition must be identified. Knowing the active site composition then allows for the control of the active site, including charge state. We used atomically precise Au nanoclusters in specific charge states (q=−1, 0, +1) as electrochemical catalysts to study the role of charged active sites in electrochemical reactions.

One embodiment of the present invention showed $Au_{25}{}^q$ nanoclusters providing charge state-dependent electrocatalytic activity for $CO_2$ reduction, $O_2$ reduction, and CO oxidation reactions in aqueous media. The small size of $Au_{25}{}^q$ clusters leads to energy level quantization and the emergence of molecule-like charge state-dependent optical absorbance spectra. $Au_{25}{}^q$ clusters possess an inherent negative charge and they carry a positive tetraoctylammonium (TOA) counter ion.

BRIEF SUMMARY

One or more embodiments relate to a method for manipulating charge state of Au nanoparticles. A preferred embodiment comprises the following steps: 1) combining at least one Au nanocluster with at least one electron accepting molecule in the presence of an excess amount of counter ion; and 2) exposing the nanocluster, electron acceptor and counter ion mixture to light creating $Au^+$ nanoclusters. In one or more embodiments, an additional step of depositing the $Au^+$ nanoclusters onto a catalyst support is performed.

In a preferred embodiment, $Au_{25}(SC_2H_4Ph)^q$ clusters were isolated (abbreviated $Au_{25}{}^q$). $Au_{25}{}^-$ and $Au_{25}{}^0$ were converted to $Au_{25}{}^+$ by illuminating an $O_2$ saturated solution containing a negative counter-ion with visible light. Additionally, the $Au_{25}{}^+$ nanoclusters were deposited onto a carbon black support. Once placed onto the catalytic support, they can be used as electrodes acting as catalysts in $CO_2$ reduction, $O_2$ reduction, and CO oxidation reactions. The charge state of the $Au^q$ cluster directly influenced reactivity where positively charged $Au_{25}{}^+$ enhanced oxidation reactions.

The multiple embodiments described herein have many advantages, including but not limited to those described above. However, embodiments do not require that all advantages and aspects be incorporated into every embodiment of the present invention.

BRIEF DESCRIPTION OF THE DRAWINGS

These and other features, aspects, and advantages of the embodiments will become better understood with reference to the following description, appended claims, and accompanied drawings where:

DETAILED DESCRIPTION

Figure 1:
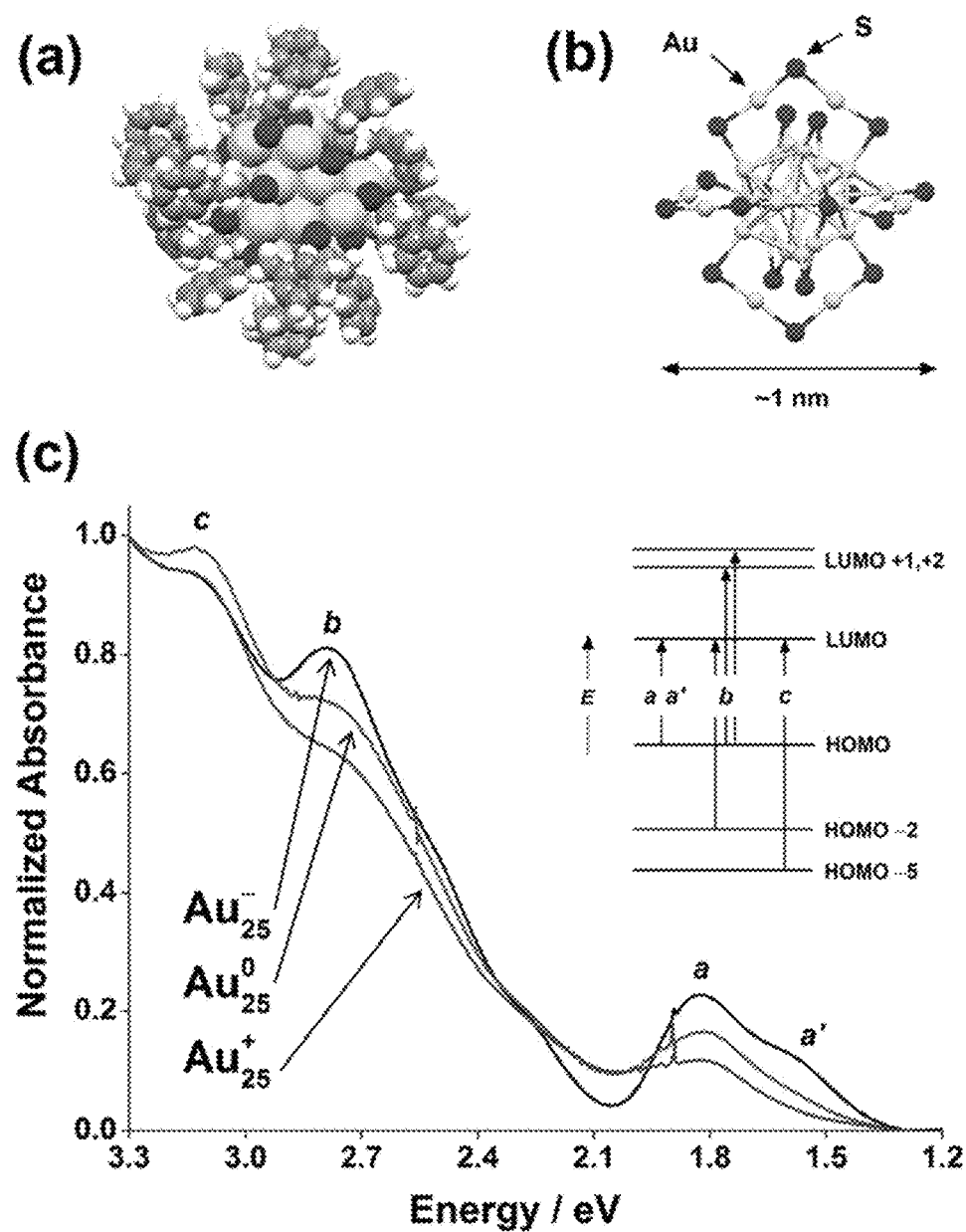
FIG. 1. (a) Space-filled model of ligand-capped $Au_{25}$ cluster (ligands=$SC_2H_4Ph$). (b) Ball-and-stick model of $Au_{25}$ showing the —S—Au—S—Au—S— bonding motif in the ligand shell; the organic ligands have been omitted for clarity. (c) Optical absorbance spectra of isolated $Au_{25}{}^-$, $Au_{25}{}^0$ and $Au_{25}{}^+$ clusters in DMF. A simplified energy level diagram describes the labelled electronic transitions FIG. 2. Components of the $Au_{25}(SCH_2CH_2Ph)_{18}{}^-$-$TOA^+$ crystal structure. (a) The $Au_{25}{}^q$ cluster contains an $Au_{13}$ "core" surrounded by a "ligand shell" with six ($Au_2S_3$) semi-ring structures. (b) Organic phenylethylthiol (PET) ligands extend off the S atoms in the ligand shell. Au25− is stabilized by a positive tetraoctylammonium ($TOA^+$) counter ion. The cluster is approximately 1 nm in diameter excluding the organic ligands at ~2.4 nm including the organic PET ligands. (c) A space fill model of the $Au_{25}{}^q$ cluster.

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide for charge state manipulation in nanoclusters and the use of such charged nanoclusters.

Generally, the present disclosure is directed to a method for manipulating charge state of Au nanoclusters and the use of such charged nanoclusters. A preferred embodiment comprises the following steps: 1) combining at least one Au$^-$ nanocluster with at least one electron accepting molecule in the presence of an excess amount of counter ion; and 2) exposing the nanocluster, electron acceptor and counter ion mixture to light creating Au$^+$ nanoclusters. In one or more embodiments, an additional step comprising depositing the Au$^+$ nanoclusters onto a catalyst support is performed.

A preferred embodiment comprises the steps of 1) combining at least one Au$^0$ nanocluster with at least one electron accepting molecule in the presence of an excess amount of counter ion; and 2) exposing the nanocluster, electron acceptor and counter ion mixture to light creating Au$^+$ nanoclusters. In one or more embodiments, an additional step comprising depositing the Au$^+$ nanoclusters onto a catalyst support is performed.

In one exemplary embodiment, the Au$^0$ cluster comprises an $Au_{25}^0$ cluster, an electron accepting molecule, and an excess amount of counter ion; and exposing the $Au_{25}^0$ cluster mix to a light source to generate an $Au_{25}^+$ cluster having different optical and reactivity properties. The light source comprises a wavelength of 680 nm or less. The electron accepting molecule, also known as an oxidizing agent, is one that accepts electrons transferred to it from another compound. Examples of such electron acceptors include but are not limited to oxygen, nitrate, iron (III), manganese (IV), sulfate, and carbon dioxide. The counter ion comprises an ion that is present in a solution but is not redox reactive. In certain preferred embodiments, the counter ion is an inorganic salt.

This light source exposure occurs in a solution containing an electron accepting molecule and $Au_{25}$ cluster. The light source comprises a wavelength of 680 nm or less. The electron accepting molecule, also known as an oxidizing agent, is one that accepts electrons transferred to it from another compound. A stoichiometric quantity, with respect to the total number of electrons transferred from the Au cluster to acceptor, are required for a complete conversion of $Au^0$ to $Au^+$. The complete conversion of charge state is achieved by adding stoichiometric quantities of Au cluster and electron acceptor directly to solution and then exposing the mixture to light. Likewise, when the solubility of the acceptor is too low to achieve stoichiometric quantities in solution, additional quantities of the acceptor can be added to the mixture during the course of the reaction. One example of a preferred embodiment comprises $O_2$ as the acceptor molecule. While the light exposure is occurring, the $O_2$ can be continually bubbled through the solution of $Au_{25}^0$ until the reaction has run to completion.

Another exemplary embodiment comprises the steps of combining at least one Au$^-$ cluster with at least one electron accepting molecule in the presence of an excess amount of counter ion; and exposing the cluster, electron acceptor and counter ion mixture to light creating Au$^+$ nanoclusters.

Another preferred embodiment additionally deposits the $Au_{25}^+$ cluster onto a catalytic support without altering the charge state of the $Au_{25}^+$ cluster. The catalytic support comprises an electrically conductive support and an electrode binder such as a conductive carbon black support and NAFION, or may be comprised of a conductive binder material such as a conductive carbon cement. The electrically conductive support and electrode binder, or the conductive binder material, may be present in $Au_{25}^+$ electrode in an amount of from 0.01% to 90% by weight of the total $Au_{25}^+$ electrode weight as described in U.S. patent application Ser. No. 14/045,886 filed on Oct. 4, 2013, herein incorporated in its entirety.

A preferred embodiment comprises the steps of 1) combining at least one Au$^-$ nanocluster with at least one electron accepting molecule in the presence of an excess amount of counter ion; 2) exposing the nanocluster, electron acceptor and counter ion mixture to light creating Au$^0$ nanoclusters; and 3) depositing the Au$^0$ nanoclusters onto a catalyst support.

In such an embodiment, the present disclosure provides a method for controlling $Au_{25}^q$ charge state leading to improved catalytic activity, comprising: $Au_{25}^-$ cluster, an electron acceptor, and an excess amount of counter ion; exposing the $Au_{25}^-$ cluster to a light source to generate an $Au_{25}^0$ cluster having different optical and reactivity properties; and placing the $Au_{25}^0$ cluster on to a catalytic support without altering the charge state of the $Au_{25}^0$ cluster. The light source comprises a wavelength of 680 nm or less.

Description of an Embodiment

Figure 2:
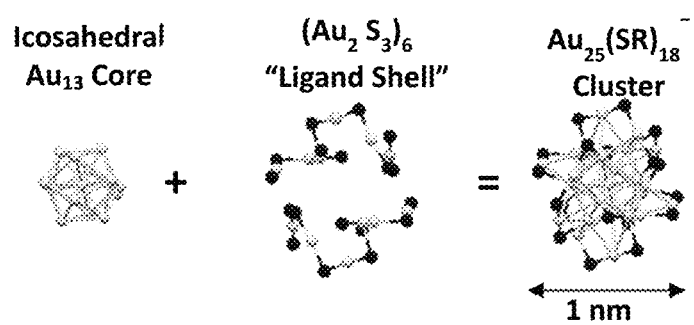
Figure 2:
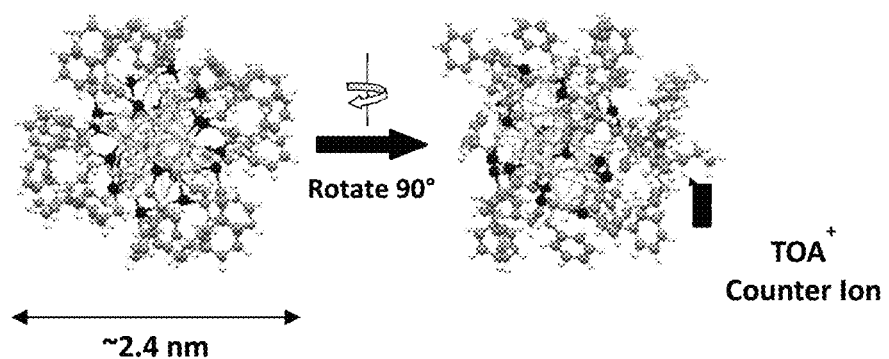
Figure 2:
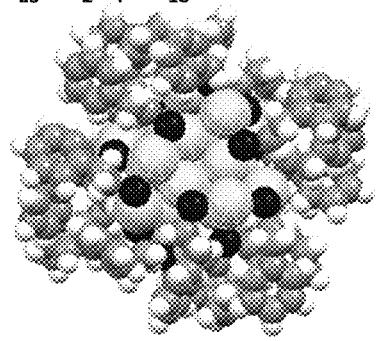

Very small, sub-2 nm metal particles can form with well-defined crystal structures, they can show enhanced chemical reactivity, and they may possess non-zero ground state charges. The ligand-protected $Au_{25}(SR)18^q$ cluster is one such example (abbreviated $Au_{25}^q$; SR=organothiol ligand). The cluster contains an $Au_{13}$ core within a shell of six —S—Au—S—Au—S— semi-ring structures as represented in FIG. 1(a). $Au_{25}^q$ clusters have a tunable ground state charge (q=−1, 0, +1), their crystal structure has been solved (See FIGS. 1 and 2), they show impressive catalytic activity, and their small size (~1 nm excluding ligands) allows computational modelling of realistic clusteradsorbate systems. Because of these characteristics, $Au_{25}^q$ clusters function as well-defined models for Au-catalyzed electrochemical reactions.

$Au_{25}^q$ clusters possess an inherent negative charge and carry a positive tetraoctylammonium (TOA) counter ion. $Au_{25}^-$ photoexcitation allows excited state charge transfer from the cluster LUMO to $O_2$. The newly formed $Au_{25}^0$ sheds its counter ion which combines with $O_2^-$ to form an $O_2^-$-$TOA^+$ complex. In order to further oxidize the $Au_{25}^0$ to $Au_{25}^+$, additional counter ion is needed. The additional counter ion is needed because the $Au_{25}^q$ clusters can only accommodate one counter ion.

The isolation of particular $Au_{25}^q$ charge states can be confirmed through characteristic changes in the optical absorbance spectrum. FIG. 1C presents the optical absorbance spectra of differently charged $Au_{25}^q$ clusters in dimethylformamide (DMF). Oxidation of Au25− into neutral $Au_{25}^0$ bleaches the a', a, and b peaks, and increases the absorbance at 2.05 eV and peak c. Oxidation into positively charged $Au_{25}^+$ produces further spectral bleaching with respect to $Au_{25}^0$. Crystallographic and X-ray spectroscopic analysis revealed the absence of oxides at the $Au_{25}^0$ or $Au_{25}^+$ surface confirming the differently charged $Au_{25}^q$ clusters share a nearly identical surface structure.

Figure 3:
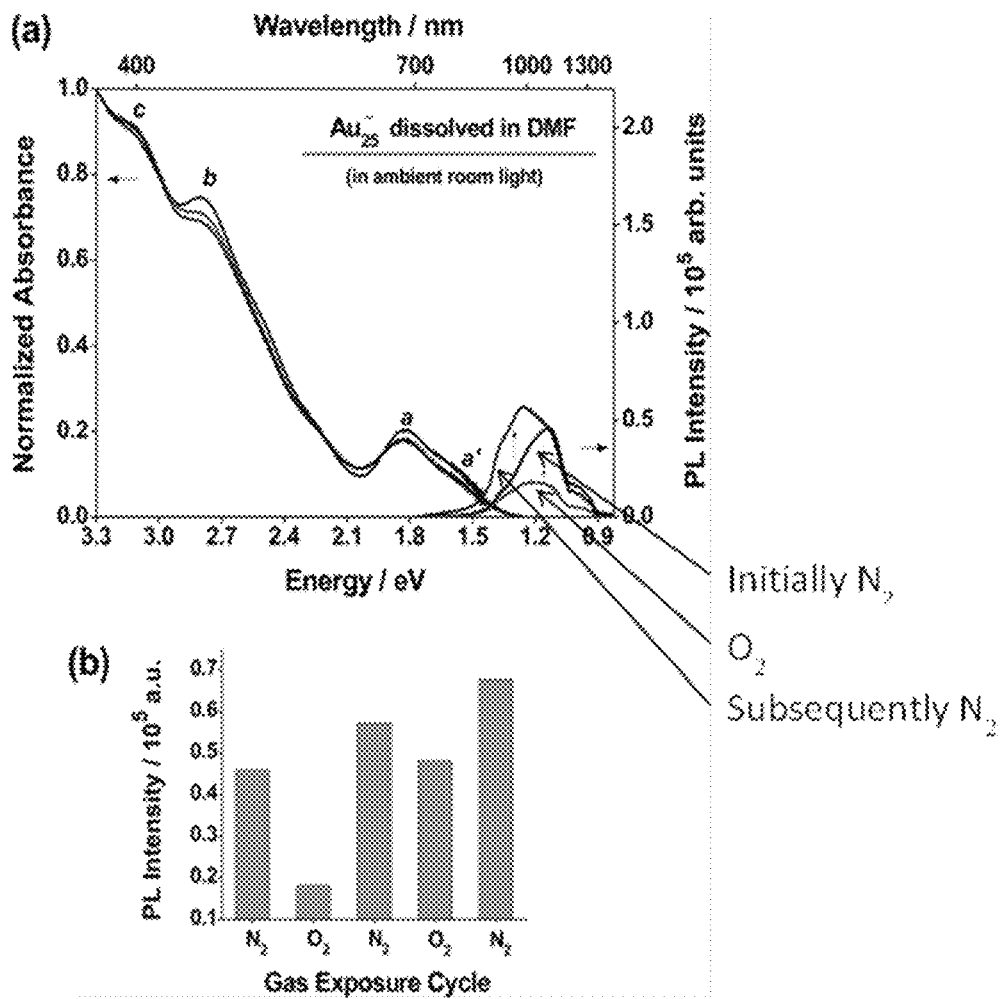
FIG. 3. Spectroscopic response of $Au_{25}{}^-$ to $O_2$ in ambient room light. (a) Absorbance and photoluminescence (PL) spectra of $Au_{25}{}^-$ in DMF that was initially purged with $N_2$, saturated with $O_2$ in ambient room light, and subsequently purged with $N_2$. The absorbance spectra were normalized at 3.3 eV to standardize the spectral background. (b) PL intensity of $Au_{25}{}^-$ in DMF that was repeatedly purged with $N_2$ and saturated with $O_2$ in ambient room light; 1 h $N_2$ and $O_2$ gas exposure cycles.

Ligand-protected $Au_{25}$ was prepared using known techniques. See e.g. Zhu et al., "Kinetically Controlled, High-Yield Synthesis of $Au_{25}$ Clusters," J. Am. Chem. Soc. 130 (2008), among others. Spectroscopy was performed as described in Kauffman et al., "Photomediated Oxidation of Atomically Precise $Au_{25}(Sc_2H_4Ph)_{18}^-$ Nanoclusters," J. Phys. Chem. Lett. 4, 195-202 (2013), herein incorporated by its entirety including the supporting information. Briefly, $Au_{25}^-$ was dissolved into ~3 mL of DMF or p-xylene and immediately placed into a sealable, septum-capped quartz cuvette (Starna). $Au_{25}^-$ solutions were initially purged with $N_2$ for one hour before collecting absorbance and photoluminescence (PL) spectra with PerkinElmer Lambda 1050, Agilent 8453, and Horiba Jobin-Yvon Fluorolog-3 spectrometers. PL spectra were excited at 2.78 eV (447 nm); this $\lambda_{ex}$ corresponds to the b optical transition (see FIGS. 1 and 3). A 2.26 eV (550 nm) low-pass optical filter was placed between the sample and the liquid $N_2$ cooled in a gas detector. This setup only allowed light containing less than 2.26 eV (wavelengths longer than 550 nm) to reach the detector, and it blocked overtones from the 2.78 eV (447 nm) excitation light. After initial spectroscopic measurements the solutions were bubbled with $O_2$ for one hour and the absorbance and PL spectra were taken again. Finally, the solutions were re-purged with $N_2$ for one hour before spectral measurements were taken to remove the PL quenching effect of dissolved $O_2$. All reported standard deviations and error bars are from 3-5 separate runs with freshly prepared $Au_{25}^-$ solutions.

Light-free $O_2$ exposure experiments were conducted in the following way: the cuvette was wrapped in Aluminum foil to exclude ambient light and the solution was purged with $N_2$ for one hour before spectroscopic measurement. After initial spectral measurement the cuvette was re-wrapped in foil and bubbled with $O_2$ for one hour in the absence of light. After $O_2$ saturation the solution was re-purged with $N_2$ for 1 hour before further spectral measurement. Spectra of $O_2$ saturated solutions were not collected during light free $O_2$ exposure experiments. This was done to prevent the spectrometer's light source from initiating photo-mediated $Au_{25}^-$—$O_2$ charge transfer.

Figure 4:
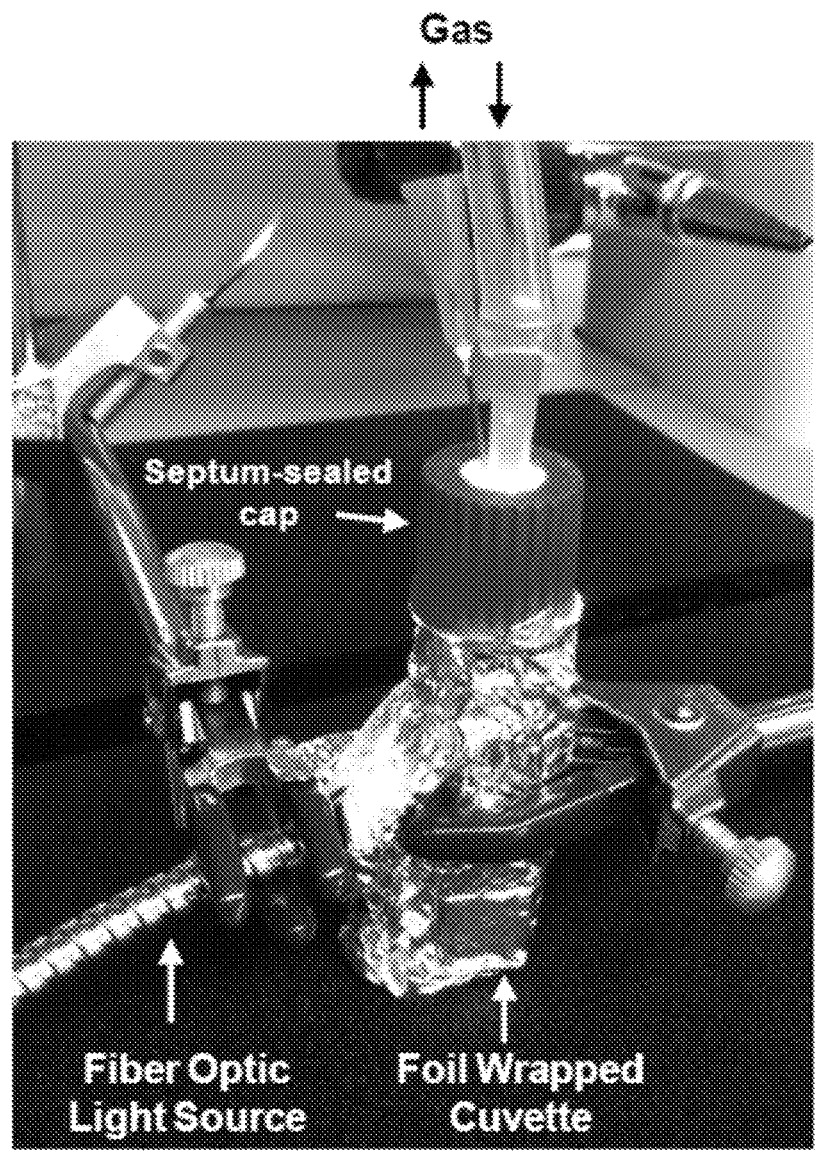
FIG. 4. Photograph showing the experimental setup for selectively illuminating $Au_{25}{}^-$ solutions with filtered light through a fiber optic cable.
Figure 5:
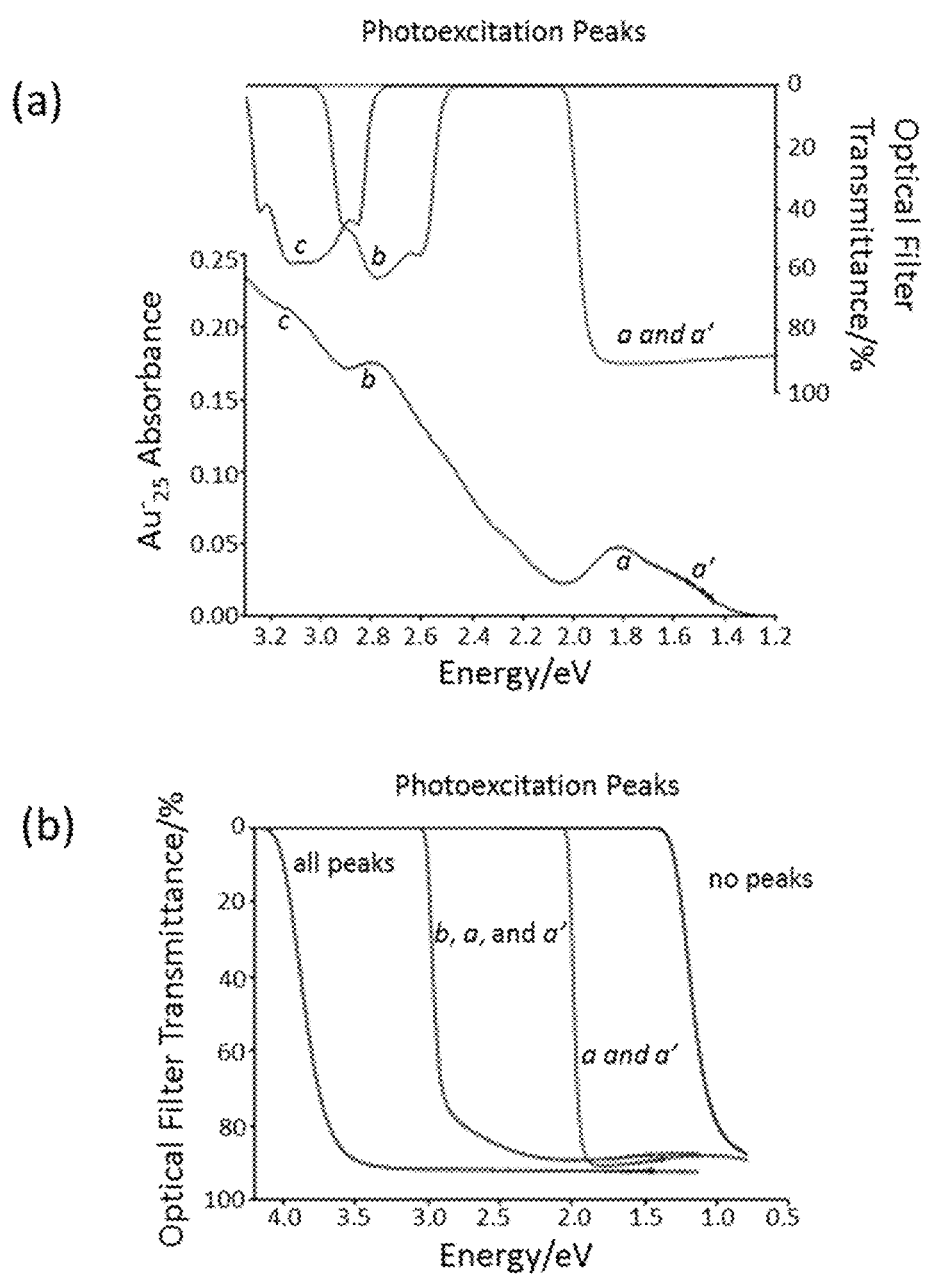
FIG. 5. (a) Comparison of the $Au_{25}{}^-$ absorbance spectrum (left axis) versus the transmittance of several band-pass and low-pass optical filters (right axis). (b) Optical transmittance the low-pass optical filters used.
Figure 6:
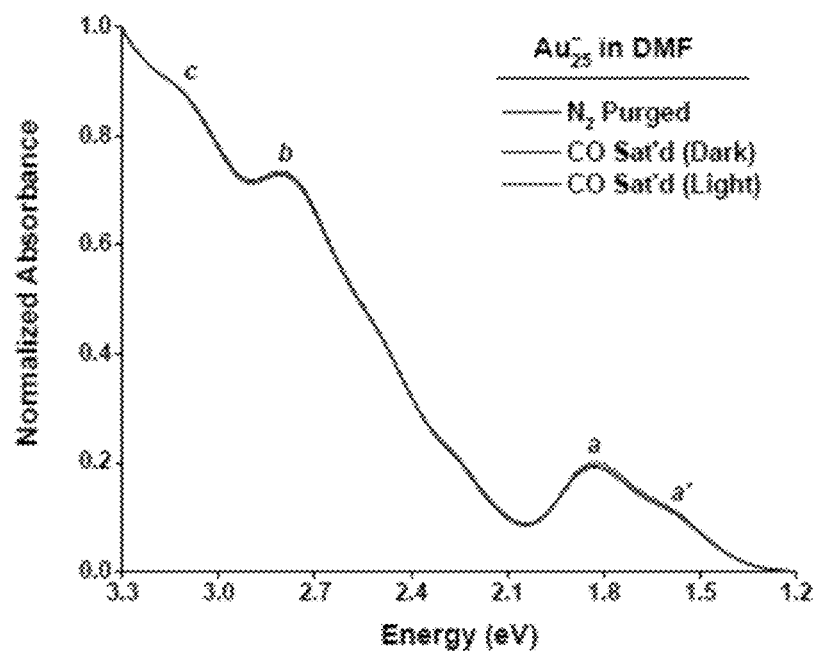
FIG. 6. Optical absorbance spectrum of $Au_{25}{}^-$ in $N_2$ purged DMF, after saturating the solution with CO gas in the dark (red curve), and after saturating the solution with CO during illumination with light containing energy greater than the $Au_{25}{}^-$ HOMO-LUMO energy gap (hv<1.9 eV; λ>650 nm light).

Illumination with specific bandwidths of light was accomplished using a fiber optic cable connected to a 300 W Xe arc lamp equipped with various low-pass and bandpass optical filters; the setup for this is shown in FIG. 4 and the transmittance spectra of the optical filters are shown in FIG. 5. Spectra were collected of initially $N_2$ purged $Au_{25}^-$ solutions. The $Au_{25}^-$ solutions were then illuminated through the optical filters for one hour while $O_2$ was bubbled through them. The $Au_{25}^-$ solutions were finally purged with $N_2$ for 1 hour in the absence of light before collection of the "after $O_2$ exposure" absorbance and PL spectra.

$Au_{25}^-$ was dissolved in $N_2$ purged DMF and transferred to a sealable, septum-capped cuvette. The cuvette was wrapped with aluminum foil to exclude ambient light and purged with $N_2$ for 30 minutes. UV-Vis absorbance spectra of $Au_{25}^-$ were then collected on a photodiode array spectrophotometer. $Au_{25}^0$ was isolated by bubbling the solution with $O_2$ for 1 hour while the solution was illuminated with a 350 W Xe-arc lamp equipped with a 650 nm long-pass optical filter. The light contained energy greater than the $Au_{25}^q$ HOMO-LUMO energy gap of ~1.4 eV and promoted excited state $Au_{25}$—$O_2$ charge transfer. Light containing less energy than the $Au_{25}^q$ HOMO-LUMO gap did not initiate excited-state charge transfer. UV-Vis spectroscopy confirmed the isolation of $Au_{25}^0$. $Au_{25}^+$ was isolated by adding about 10 to 20 molar excess of tetrabutylammonium perchlorate (TBAP) and bubbling $O_2$ through an $Au_{25}^-$ or $Au_{25}^0$ solution during illumination with light having a wavelength of 650 nm or less. The perchlorate anion stabilized $Au_{25}^+$. The $Au_{25}^0$ or $Au_{25}^+$ absorbance spectra stabilized after around 20 to 30 minutes of illumination. However, a one hour illumination period was used to ensure complete charge state conversion.

Isolated $Au^q$ charge states were precipitated onto catalytic support as described in Kauffman et al., "Proving Active Site Chemistry with Differently Charged $Au_{25}^q$ nanoclusters (q=−1, 0, +1)" Chem. Sci, 5, 3151, 2014, which is herein incorporated in its entirety including the supplemental information. Briefly, Isolated $Au^q$ charge states were sonicated with carbon black in the absence of light. Methanol addition was used to precipitate the $Au_{25}^q$ clusters onto the carbon black support since the PET-capped $Au_{25}^q$ clusters are not soluble in methanol. The methanol was then decanted off, the carbon black supported $Au_{25}^q$ clusters were sonicated in fresh methanol and centrifuged. The samples were then dried under $N_2$ for future use. The catalyst loading is adjusted through the concentration of the $Au_{25}^q$ solution and ratio of $Au_{25}^q$ to carbon black. Carbon black is used as a support because it is conductive and shows little activity towards $CO_2$ reduction or CO oxidation.

CB-supported $Au_{25}^q$ clusters were sonicated in a mixture of 200 µL methanol and 20 µL of a 5% Nafion solution. 5-20 µL of the $Au_{25}q$/CB suspension was then dropcast onto a glassy carbon electrode. The Nafion binder adheres the CB-supported $Au_{25}^q$ to the electrode but still allows solvent and reactant access to the cluster surface. Electrochemical experiments were conducted with a potentiostat and an electrode rotation controller. Cyclic voltammetry (CV) was repeated until stable curves were obtained. Polarization curves were then taken from the stabilized CVs. A Hydroflex reversible hydrogen electrode (abbreviated RHE) was used for $CO_2$ reduction studies. An Ag/AgCl (3.0 M NaCl) reference electrode was used for CO oxidation and $O_2$ reduction studies. The Ag/AgCl electrode was calibrated against the RHE in $N_2$ purged 0.1 M KOH after each experiment, and all potentials are reported in the RHE scale. A Pt wire counter electrode was used for $CO_2$ and $O_2$ reduction experiments. An Au wire counter electrode was used for CO oxidation reactions.

Figure 7:
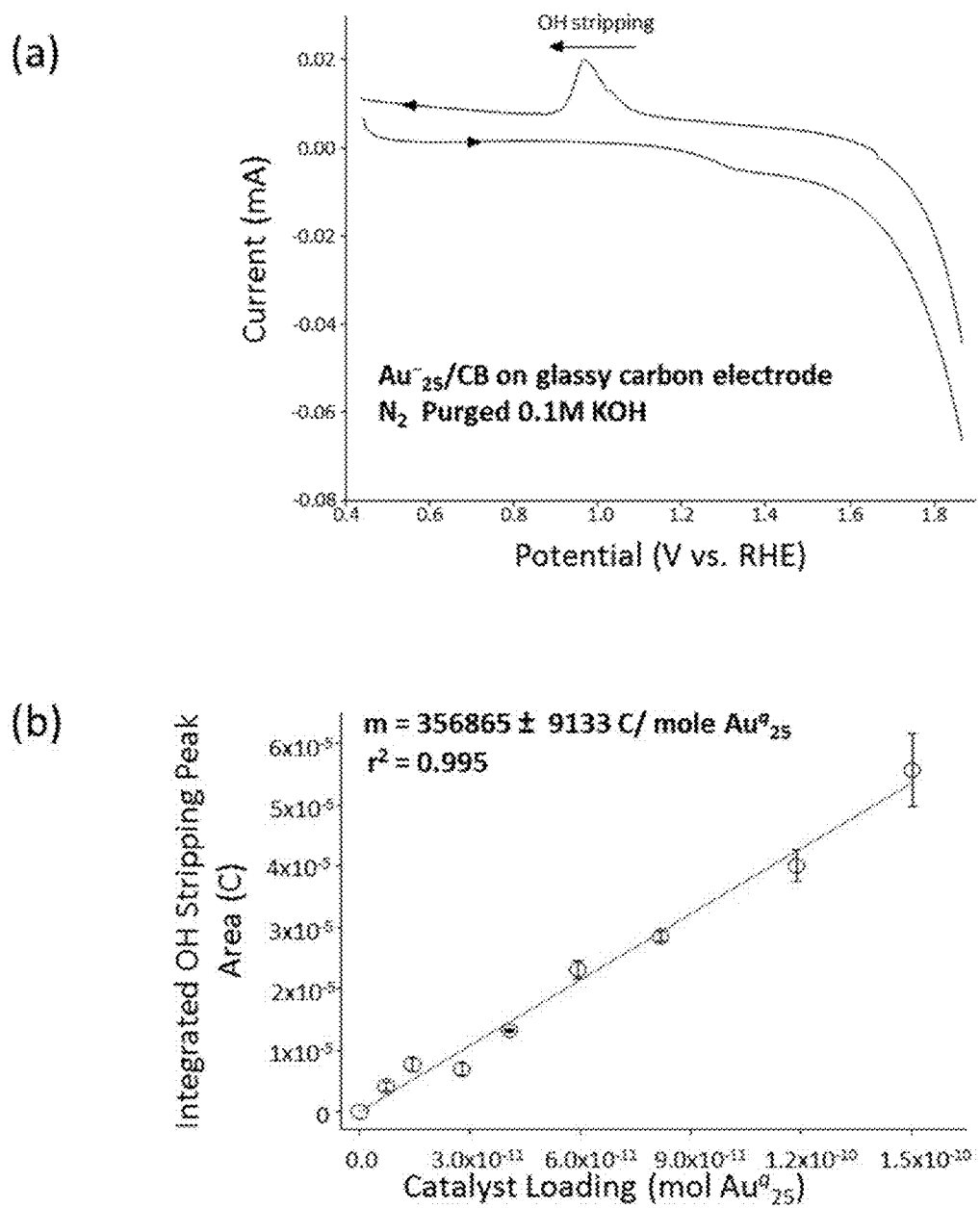
FIG. 7. (a) RDE voltammogram of $Au_{25}{}^-$/CB in $N_2$ purged KOH showing the $OH^-$ stripping peak at approximately +1.0 V vs. RHE (ω=2500 rpm; 50 mV/s scan rate). (b) Integrated OH stripping peak area vs. catalyst loading. Error bars at each catalyst loading represent three OH stripping experiments with freshly deposited $Au_{25}{}^q$/CB.

Quantification of $Au_{25}^q$ on the Electrode Surface was performed. OH stripping voltammetry was conducted in $N_2$ purged 0.1 M KOH. $Au_{25}^-$ was first dissolved in acetone and the absorbance spectrum was collected. The concentration of the $Au_{25}^-$ solution was determined from the known molar absorptivity [$\varepsilon$=8.8×103 a.u./M/cm @1.83 eV (680 nm, labeled peak a in FIG. 1c of the main text)]. A precise volume of dissolved $Au_{25}^-$ (in acetone) was added to 200 µL of CB suspended in MeOH (1 mg/mL in MeOH). Additional MeOH was then added to bring the mixture volume to 300 µL. The mixture was briefly sonicated and 20 µL of Nafion was added to bring the total solution volume to 320 µL. The mixture was briefly sonicated once more and then the $Au_{25}^-$/CB mixture was added to a GC electrode in 5.5 µL increments. Total $Au_{25}^-$/CB loadings on the electrode ranged between 5.5-11 µL (1-2 additions). Cyclic voltammetry was conducted at $\omega$=2500 RPM between +0.44 and +1.94 V vs. RHE until stable OH stripping voltammograms were obtained. The OH stripping peak was then integrated and plotted against the moles of $Au_{25}^-$ on the electrode surface (FIG. 7). Alternatively, the electrochemical surface area (ECSA) could be estimated from the OH stripping peak area using the literature value for bulk Au (390 µC cm−2 Au).

Figure 8:
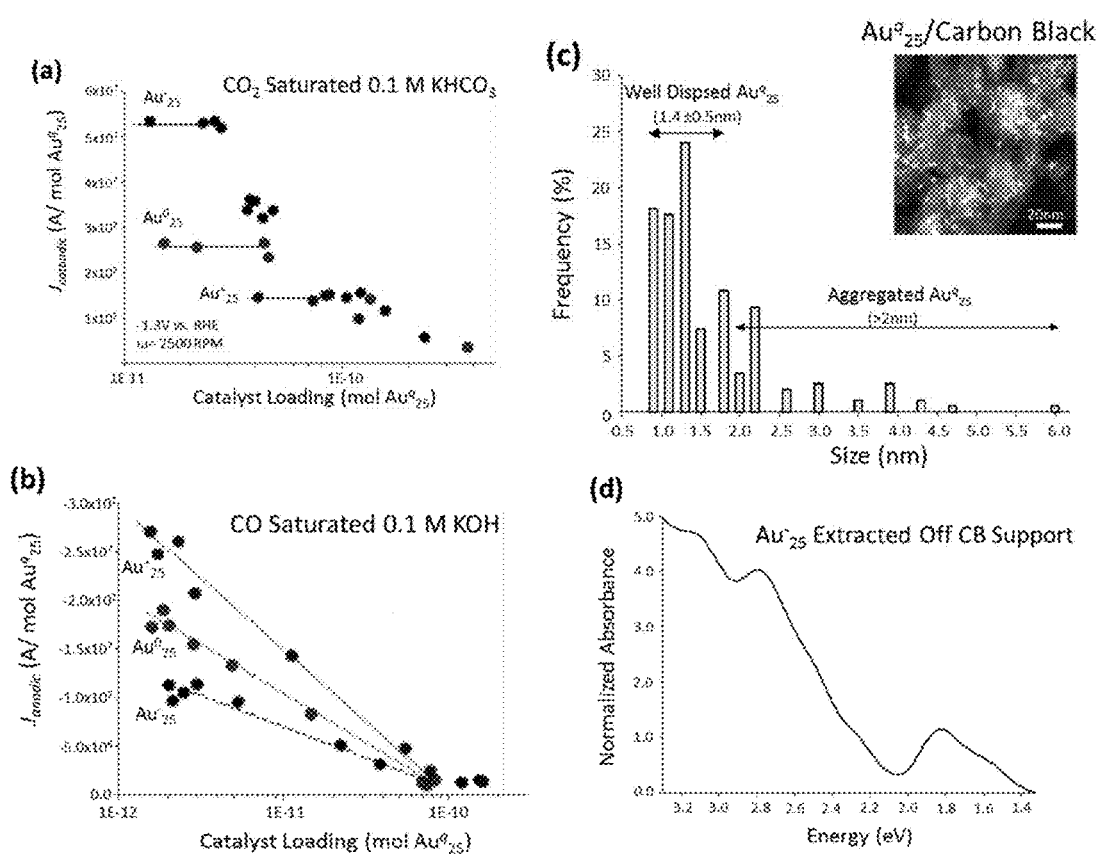
FIG. 8. Variation in measured current density j (A/mole $Au_{25}{}^q$) vs. catalyst loading (moles $Au_{25}{}^q$) for (a) $CO_2$ reduction (measured at −1.3 V vs. RHE) and (b) CO oxidation reactions (measured at peak CO oxidation potential). Data points represent the raw data collected from polarization curves and the dashed lines serve as a guide to the eye. (c) TEM image and particle size distribution of an $Au_{25}^q$/CB sample in the high $Au_{25}^q$ loading regime. (d) Optical absorbance spectra of $Au_{25}^-$ extracted back off the CB support. Retention of optical absorbance spectra indicates larger $Au_{25}^q$ aggregates in FIG. 8c are likely closely spaced, individual $Au_{25}^q$ clusters, and necessarily rules out the clusters sintering into larger particles.

Transmission electron microscopy (TEM) was performed and showed isolated $Au_{25}^q$ clusters and larger cluster aggregates on the carbon black support, see FIG. 8. The cluster size shown is consistent with the 1 nm diameter expected from $Au_{25}^q$ crystal structure determination. The carbon black supported $Au_{25}^q$ clusters retained their charge state dependent absorbance spectra once extracted back into DMF (FIG. 7), indicating the particular $Au_{25}^q$ charges were stable on the carbon black support. The $Au_{25}^q$ clusters were also stable under electrochemical potentials in aqueous media. See FIG. 8.

Differently charged $Au_{25}^q$ clusters were deposited onto carbon black for electrocatalytic studies. Electrocatalytic current densities were normalized to the moles of $Au_{25}^q$ on the electrode and equivalent $Au_{25}^q$ loadings were used for all catalytic activity measurements. Equivalent catalyst loadings minimize catalyst crowding effects from overlapping diffusion regions that can erroneously lower the apparent catalytic activity.

Figure 9:
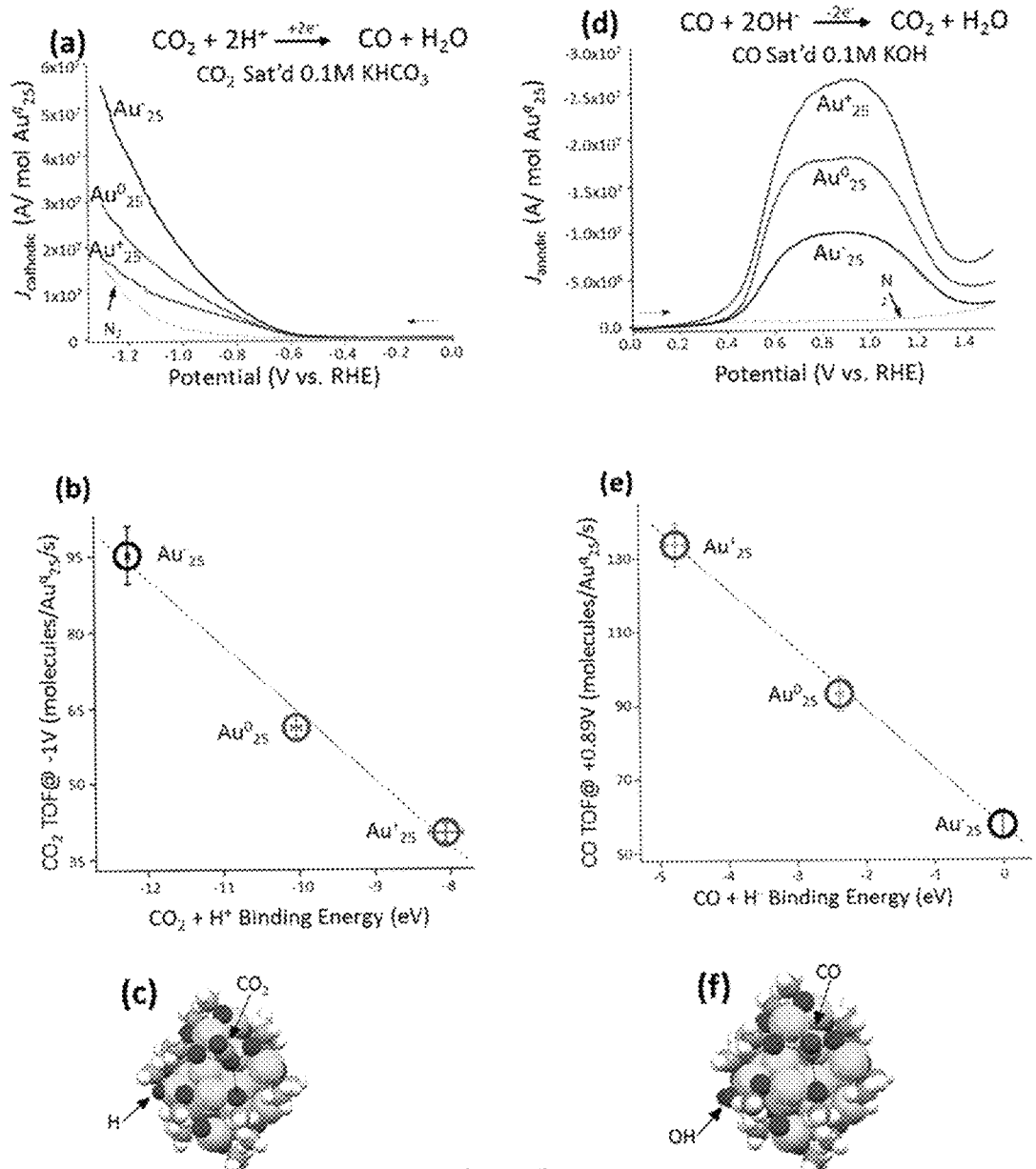
FIG. 9. (a and d) Rotating disk electrode (RDE) polarization curves for CB-supported $Au_{25}^q$ (a) CO2 saturated 0.1 M $KHCO_3$ and (d) CO saturated 0.1 M KOH; the electrode rotation rate was co=2500 rpm and dashed polarization curves represent $Au_{25}^-$ in $N_2$ purged solution. Current densities were normalized to the moles of $Au_{25}^q$ on the electrode and equivalent $Au_{25}^q$ loadings were used to compare electrocatalytic activity. (b and e) Correlation between reactant binding energy and reaction turnover frequency (TOF) for (b) $CO_2$ reduction at −1 V and (e) CO oxidation at +0.89 V. Error bars are from three experimental TOF determinations and DFT analysis of three coadsorbate geometries for each $Au_{25}^q$ charge state (note: only one stable CO+OH$^-$ geometry was found for $Au_{25}^-$); dashed lines serve as a guide for the eye. (c and f) Representative $Au_{25}^q$-coadsorbate models.

FIG. 9 presents rotating disk electrode polarization curves of CB-supported $Au_{25}^q$ in $CO_2$ saturated 0.1 M KHCO3 (rotation rate: $\omega$=2500 rpm; scan rate v=10 mV/sec); the dashed line shows $Au_{25}^-$ polarization in $N_2$ purged solution. Higher cathodic current density ($j_{cathodic}$) represents increased $CO_2$ reduction, and $Au_{25}^-$ produced consistently higher current density compared with $Au_{25}^0$ and $Au_{25}^\pm$. Reaction turnover frequencies (TOF: molecules/Au $Au_{25}^q$/s) were current density as shown in Table 1.

TABLE 1

Reaction TOF determined from polarization curves at the indicated potentials; standard deviations are from three runs with freshly deposited Au25q/CB samples.

| TOF (molec./$Au_{25}^q$/s) | $CO_2$ Reduction (−1.0 V) | CO Oxidation (+0.89 V) | $O_2$ Reduction (−0.5 V) |
| --- | --- | --- | --- |
| $Au_{25}^-$ | 95.2 ± 5.7 | 57.4 ± 3.9 | 25.3 ± 1.5 |
| $Au_{25}^0$ | 61.1 ± 2.5 | 93.2 ± 4.7 | 20.0 ± 1.7 |
| $Au_{25}^+$ | 40.1 ± 1.9 | 133.6 ± 5.9 | 16.0 ± 0.5 |

The polarization curves in FIG. 9(a) provide equivalent Tafel slopes (71±8 mV/dec) and onset potentials (−0.223±0.049 V) that are consistent with other high activity, Au-based $O_2$ reduction catalysts. Electrocatalytic $CO_2$ reduction can produce a variety of products such as CO, HCOOH, $CH_3OH$, $CH_4$, and larger hydrocarbons based on the type of metal used. All $Au_{25}^q$ clusters selectively converted $CO_2$ to CO during constant potential electrolysis at −1V in a sealed electrochemical H-cell. $Au_{25}^0$ showed 82±7% Faradaic efficiency (FE) for CO production while $Au_{25}^+$ produced CO with 81±1% FE.

The equivalent reaction products, onset potentials, and Tafel slopes indicate a common reaction mechanism at the differently charged $Au_{25}^q$ clusters. Reactant adsorption is a critical step in the $Au_{25}$-catalyzed reduction of $CO_2$, and dramatically increased reaction rates are observed upon $H^+$ coadsorption and Hads formation. The $Au_{25}^q$ clusters share an identical size, shape, surface stoichiometry and $CO_2$ reduction mechanism, and they only differ in ground state charge. Therefore, catalytic activity differences are attributed to reactant adsorption at the differently charged $Au_{25}^q$ clusters.

First principles density functional theory (DFT) was used to analyze $CO_2+H^+$ coadsorption at realistic, fully ligand-protected $Au_{25}(SCH_3)_{18}^q$ cluster models with charge states of q=1, 0, +1. The calculations identified several common $CO_2+H^+$ coadsorbed states at the differently charged $Au_{25}^q$ clusters. The coadsorbed states were energetically equivalent at any one $Au_{25}^q$ cluster, but consistently larger binding energies were identified at $Au_{25}^-$. FIG. 9(b) shows a positive correlation between $CO_2+H^+$ binding energy and the experimentally determined TOF, where larger binding energy indicates increased adsorbate stability. The error bars represent three separate experimental TOF determinations and DFT analysis of three $CO_2+H^+$ coadsorbed states for each $Au_{25}^q$ charge state.

FIG. 9(c) contains a representative $Au_{25}^q$ coadsorbate model with H bound to one ligand-shell Au atom and $CO_2$ coordinated with three ligand S atoms in cluster's "adsorption pocket". Two additional, energetically equivalent coadsorbed geometries were identified at each $Au_{25}^q$ charge state, and $CO_2$ may occupy multiple states within the adsorption pocket before combining with H. In all cases the $Au_{25}^q$ structure remained intact upon reactant adsorption.

Lateral interactions between coadsorbed $CO_2$ and H were small, and binding energies for coadsorbed reactants were comparable to the combination of singly-bound $Au_{25}^q$—$CO_2$ and $Au_{25}^q$—H. Individually, $CO_2$—$Au_{25}^q$ binding ranged between −0.088 eV to −0.61 eV and $Au_{25}^q$—H binding ranged from −8.2 eV for $Au_{25}^+$ and −12.2 eV for $Au_{25}^-$. These results are consistent with previous analysis of the singly-bound $Au_{25}^-$—$CO_2$ system and other DFT results for $H^+$ adsorption at an anionic di-iron cluster. The comparatively low $CO_2$ binding energies reflect the reversible nature of $CO_2$—$Au_{25}^q$ adsorption and identify $H^+$ coadsorption as a critical parameter affecting the $CO_2$ reduction rate. Experimentally, electrochemical potentials overcome the energy barriers associated with the combination of $CO_2$ and H into COOH intermediates and the formation of the CO reaction product. The weakly bound reaction product (vide infra) will quickly desorb from the $Au_{25}^q$ cluster and should not slow reaction kinetics. Therefore, reactant adsorption is the apparent rate limiting step in $Au_{25}$-catalyzed $CO_2$ reduction, and $Au_{25}^-$ showed higher reaction TOFs because it promoted $CO_2+H^+$ coadsorption.

The role of $Au_{25}^q$ charge state in the electrocatalytic oxidation of CO was also explored. This reaction proceeds through the combination of coadsorbed CO and OH. FIG. 9(d) presents RDE polarization curves of CB-supported $Au_{25}^q$ in CO saturated 0.1 M KOH ($\omega$=2500 RPM, v=50 mV/s); the dashed line shows $Au_{25}^-$ polarization in $N_2$ purged solution. CO oxidation produces an apparent peak because preferential $OH^-$ adsorption beyond +1 V blocks the $Au_{25}^q$ cluster surface and decreases the reaction rate. CO adsorption resumes in the reverse, cathodic-going sweep to produce a second peak. Cationic $Au_{25}^+$ produced consistently larger CO oxidation current density, and Table 1 summarizes the reaction TOFs at peak CO oxidation potential. The CB support showed negligible CO oxidation activity.

Levich analysis of the RDE polarization curves confirmed the complete oxidation of CO into CO2 at each $Au_{25}^q$ charge state with an average electron transfer number of 2.08±0.06 e−. Equivalent Tafel slopes (95 ±17 mV/dec), onset potentials (0.411±0.036 V), and peak CO oxidation potentials (0.886±0.063 V) were also found for the differently charged $Au_{25}^q$ clusters. The polarization data are consistent with other Au electrocatalysts and indicate a common reaction mechanism at the differently charged $Au_{25}^q$ clusters.

Electrocatalytic CO oxidation rates are limited by the availability of coadsorbed OH, and FIG. 2e shows a positive correlation between the experimentally determined TOFs and the DFT predicted $CO+OH^-$ binding energies. In comparison, a previous DFT study predicted $CO+OH^-$ binding energies up to −2.70 eV at a neutral Au(111) surface. FIG. 9(f) contains a representative model of the $Au_{25}^q$-coadsorbate system with OH bound to one ligand-shell Au atom and CO coordinated with three ligand-shell S atoms in the adsorption pocket. Two additional, energetically similar coadsorbed states were identified at each of the $Au_{25}^0$ and $Au_{25}^+$ clusters, and CO may occupy multiple energetically equivalent states on $Au_{25}^0$ or $Au_{25}^+$ before combining with OH.

$CO+OH^-$ binding energies were comparable to the combination of singly-adsorbed $Au_{25}^q$—CO and $Au_{25}^q$—OH. Individually, $Au_{25}^q$—CO binding ranged between −0.086 eV to −0.60 eV, and $Au_{25}^q$—OH binding was −4.88 eV for $Au_{25}^+$ and −2.41 eV for $Au_{25}^0$. Interestingly, no stable $Au_{25}^-$—OH states were found in the absence of CO. Experimentally, the applied electrochemical potentials overcome reaction barriers associated with the combination of CO and OH into COOH intermediates and formation of the $CO_2$ reaction product. Weak $CO_2$ binding at each $Au_{25}^q$ charge state suggests product desorption is fast, and the surface is free to adsorb additional CO and $OH^-$ reactants. These results suggest reactant adsorption is also the apparent rate limiting step in $Au_{25}^q$-catalysed CO oxidation, and $Au_{25}^+$ shows higher CO oxidation rates because its positive charge promotes reactant coadsorption.

Figure 10:
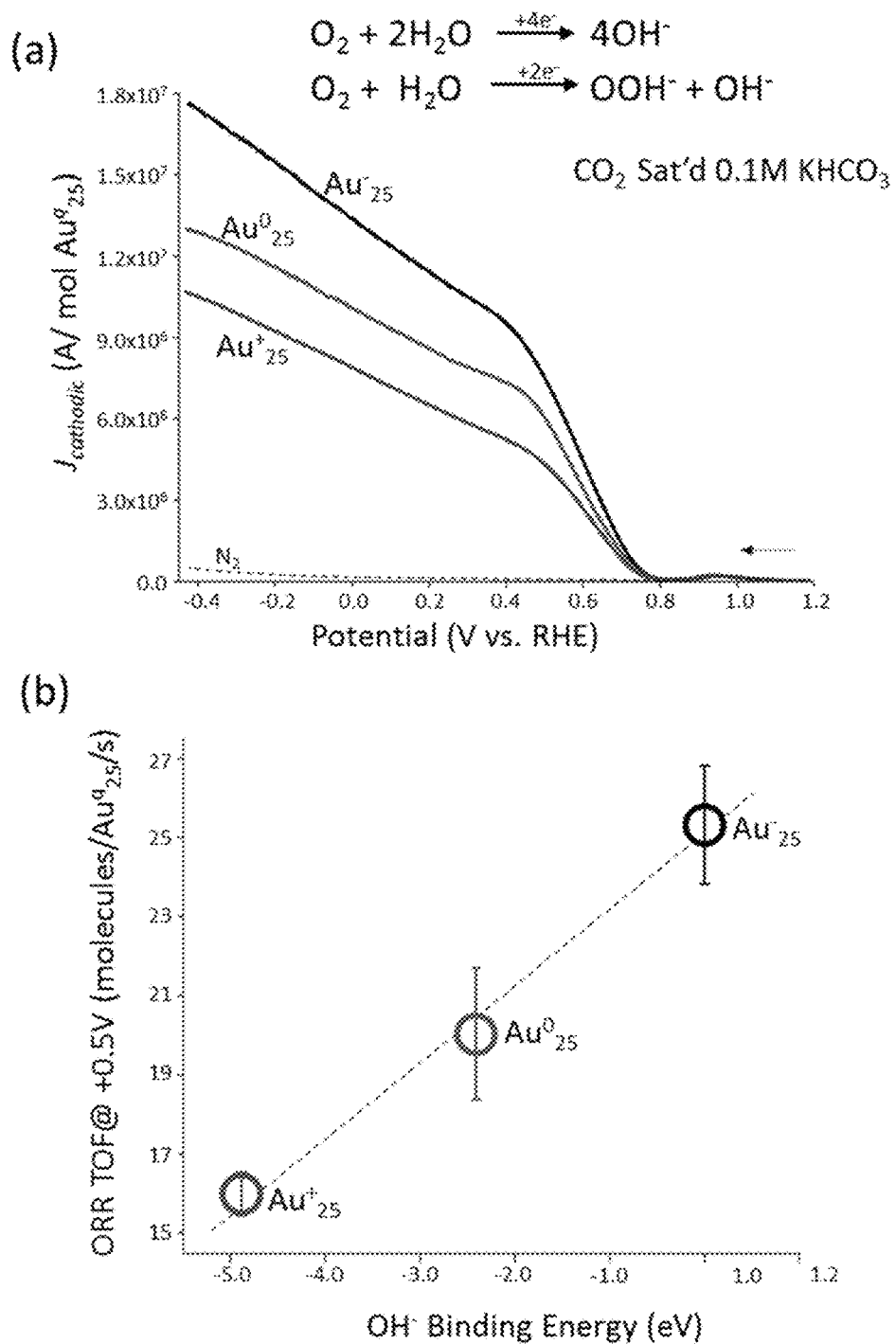
FIG. 10. (a) RDE polarization curves of CB-supported $Au_{25}^q$ in $O_2$ saturated 0.1 M KOH; ω=2500 rpm, v=50 mV/s and the dashed polarization curve represents $Au_{25}^-$ in $N_2$ purged 0.1 M KOH. (b) Turnover frequency at +0.5 V vs. product (OH$^-$) binding energy; error bars are from three experimental TOF.

Charged active sites can also inhibit catalytic activity by strongly adsorbing the reaction products. The data in FIG. 10 and Table 1 show an O2 reduction reaction (ORR) activity trend of $Au_{25}^->Au_{25}^0>Au_{25}^+$ in alkaline media. The $Au_{25}^q$ clusters produced equivalent electron transfer numbers of 3.0±0.3 e− between +0.5 V and −0.4 V, and $O_2$ was reduced through a combination of 4e− and 2e− pathways into $OH^-$ and $OOH^-$. DFT calculations showed weak $O_2$ binding at ground-state $Au_{25}^q$ clusters, and $Au_{25}^q$—$O_2$ charge transfer was previously found to require $Au_{25}^q$ photoexcitation or ligand removal. However, both experimental and computational results indicate stronger $OH^-$ binding at the positively charged $Au_{25}^+$ cluster.

FIG. 10(b) presents an inverse relationship between the calculated binding energy of ORR products ($OH^-$) and the experimentally measured TOF at +0.5 V. We chose to present the TOF at +0.5 V because the contribution from the CB support is small at this voltage, but $Au_{25}^-$ showed significantly higher TOFs (>95% CL) at all potentials between +0.5 V and −0.4 V. These results identify product desorption as an apparent rate limiting step during the $Au_{25}^q$-catalyzed ORR. Stronger product binding at $Au_{25}^+$ inhibits $O_2$ adsorption and reduces the ORR activity at any given potential compared with neutral $Au_{25}^0$ and negatively charged $Au_{25}^-$. Strong product binding has also been shown to block the surface of other ORR catalysts, but previous studies did not consider the relationship between active site charge and product biding.

Figure 11:
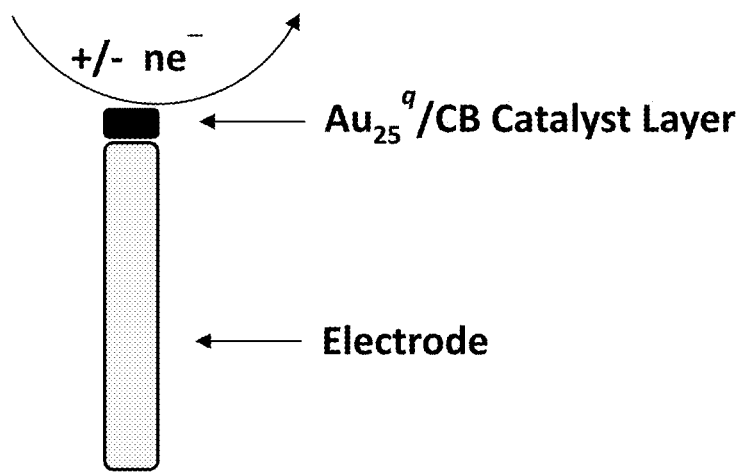
FIG. 11. A depiction of the $Au_{25}^q$ electrode.

FIG. 11 shows a representative schematic of an $Au^{0/+}$ electrode. The electrode can be made with neutrally charged $Au^0$, or with positively charged $Au^+$. Both electrodes are prepared in the same manner. An exemplary embodiment of preparing an $Au_{25}^0$ electrode comprises isolating $Au_{25}^0$ charge states in DMF, sonicating in combination with carbon black (CB) in the absence of light. PET-capped $Au_{25}^0$ are not soluble in methanol (MeOH), and MeOH addition precipitated the $Au_{25}^0$ clusters onto the CB support. The $Au_{25}^0$/CB suspension was centrifuged and the liquid was decanted off. The CB-supported $Au_{25}^0$ clusters were re-sonicated in fresh MeOH, centrifuged again and the MeOH was decanted off. This was done a total of 3 times. Samples were then dried under $N_2$ for future use. The ratio of $Au_{25}^0$ to CB was adjusted through the starting concentration of $Au_{25}^0$ in DMF and the volume of dissolved $Au_{25}^0$ added to CB. CB-supported $Au_{25}^0$ clusters were sonicated in a mixture of 200 µL methanol and 20 µL of a 5% Nafion solution. 5-20 µL of the $Au_{25}^0$/CB suspension was then dropcast onto a glassy carbon electrode for electrochemistry experiments.

An additional exemplary embodiment is the preparation of an $Au_{25}^+$ electrode. This exemplary embodiment comprises isolating $Au_{25}^+$ charge states in DMF, sonicating in combination with carbon black (CB) in the absence of light. PET-capped $Au_{25}^+$ are not soluble in methanol (MeOH), and MeOH addition precipitated the $Au_{25}^+$ clusters onto the CB support. The $Au_{25}^+$/CB suspension was centrifuged and the liquid was decanted off. The CB-supported $Au_{25}^+$ clusters were re-sonicated in in fresh MeOH, centrifuged again and the MeOH was decanted off. This was done a total of 3 times. Samples were then dried under $N_2$ for future use. The ratio of $Au_{25}^+$ to CB was adjusted through the starting concentration of $Au_{25}^+$ in DMF and the volume of dissolved $Au_{25}^+$ added to CB. CB-supported $Au_{25}^+$ clusters were sonicated in a mixture of 200 µL methanol and 20 µL of a 5% Nafion solution. 5-20 µL of the $Au_{25}^+$/CB suspension was then dropcast onto a glassy carbon electrode.

The results presented help identify the role of charged active sites in Au-catalyzed electrochemical reactions. oxidized For example, highly oxidized Au nanoparticles have previously shown enhanced electrocatalytic CO activity. These nanoparticles had high surface concentrations of $Au^{3+}$ species, but their mechanistic role in the CO oxidation reaction was not clear. The presented results with $Au_{25}^+$ show that positively charged $Au^{n+}$ species promote CO oxidation by stabilizing coadsorbed CO and OH. This finding is analogous to the hypothesized role of $Au^{n+}$ sites in the thermally-driven CO oxidation reaction, and electrocatalysts with positively charged active sites should show superior CO oxidation activity. $OH^-$ functions as an oxidant in many electrocatalytic reactions and this phenomenon likely extends to other systems.

High $CO_2$ activity has also been reported for anionic $Au_{25}^-$ clusters, neutral Au nanoparticles and oxide-derived (cationic) Au catalysts Enhanced $CO_2$ activity has recently been proposed for Au sites that can stabilize adsorbed —COOH intermediates; however, only neutral sites were considered. These results indicate that reactant adsorption is an extremely important step, and that negatively charged $Au_{25}^-$ clusters promote $CO_2$ reduction by stabilizing $CO_2$ and $H^+$ coadsorption. Accordingly, electrocatalysts with high concentrations of anionic active sites should exhibit superior $CO_2$ reduction activity. The results also shown that positively charged active sites inhibit alkaline ORR activity by stabilizing adsorbed reaction products, and enhanced ORR activity should be observed for anionic sites that facilitate $OH^-$ and $OOH^-$ desorption.

The presented DFT calculations modeled the clustercoadsorbate systems in vacuum, and a fully solvated environment or applied electrochemical potentials were not considered. Water molecules and electrochemical potentials may impact elementary reaction energetics compared with those calculated in vacuum and some computational approaches have successfully used periodic single crystal substrates to model the electrode surface. However, it isn't yet clear how well this approach can describe atomically-precise, ligand-protected nanoclusters with well-defined crystal structures. The influence of the electrochemical environment on reaction energetics is important in an absolute sense, but the predicted trends obtained here should persist in a fully solvated environment.

Experimentally, charge state-dependent reactivity for the $CO_2$ reduction, CO oxidation and $O_2$ reduction reactions were observed to be over a range of electrochemical potentials. This observation indicates the general trend of reactant binding vs. $Au_{25}^q$ charge state holds true under electrochemical potential control. The $Au_{25}^q$ electronic structure during electrocatalytic reactions has not yet been characterized, but the retention of characteristic charge state-dependent optical absorbance spectra after electrocatalytic reactions indicates the $Au_{25}^q$ are stable at these conditions.

$Au_{25}^q$ nanoclusters with discrete ground-state charges were used to study the role of charged active sites on gold electrocatalysts. The results show that active site charges impact catalytic reactivity by stabilizing reactant or product adsorption. Specifically, negatively charged $Au_{25}^-$ showed enhanced $CO_2$ reduction activity by stabilizing $CO_2+H^+$ coadsorption. Positively charged $Au_{25}^+$ clusters showed enhanced CO oxidation activity by stabilizing $CO+OH^-$ coadsorption. Positively charged $Au_{25}^+$ clusters also showed decreased $O_2$ reduction activity because they more strongly bind the $OH^-$ reaction product. The results highlight the role of charged active sites electrocatalytic reactions and demonstrate that catalytic activity can be tuned through electronic structure control.

Having described the basic concept of the embodiments, it will be apparent to those skilled in the art that the foregoing detailed disclosure is intended to be presented by way of example. Accordingly, these terms should be interpreted as indicating that insubstantial or inconsequential modifications or alterations and various improvements of the subject matter described and claimed are considered to be within the scope of the spirited embodiments as recited in the appended claims. Additionally, the recited order of the elements or sequences, or the use of numbers, letters or other designations therefor, is not intended to limit the claimed processes to any order except as may be specified. All ranges disclosed herein also encompass any and all possible subranges and combinations of subranges thereof. Any listed range is easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as up to, at least, greater than, less than, and the like refer to ranges which are subsequently broken down into sub-ranges as discussed above. As utilized herein, the terms "about," "substantially," and other similar terms are intended to have a broad meaning in conjunction with the common and accepted usage by those having ordinary skill in the art to which the subject matter of this disclosure pertains. As utilized herein, the term "approximately equal to" shall carry the meaning of being within 15, 10, 5, 4, 3, 2, or 1 percent of the subject measurement, item, unit, or concentration, with preference given to the percent variance. It should be understood by those of skill in the art who review this disclosure that these terms are intended to allow a description of certain features described and claimed without restricting the scope of these features to the exact numerical ranges provided. Accordingly, the embodiments are limited only by the following claims and equivalents thereto. All publications and patent documents cited in this application are incorporated by reference in their entirety for all purposes to the same extent as if each individual publication or patent document were so individually denoted.

We claim:

1. A method for oxidization of a ligand protected $Au_{25}$ adsorbate comprising:
 combining said $Au_{25}$ adsorbate with an electron accepting molecule and an excess amount of counter ion comprising an inorganic salt; and,
 exposing said combination to a photophysical process in order to achieve an $Au_{25}$ adsorbate with an +1 tunable ground state charge of ($Au_{25}^+$).

2. The method of claim 1 wherein said $Au_{25}$ adsorbate comprises $Au_{25}(SC_2H_4Ph)_{18}$.

3. The method of claim 2 further wherein said $Au_{25}(SC_2H_4Ph)_{18}$ is negatively charged $Au_{25}(SC_2H_4Ph)_{18}^-$.

4. The method of claim 2 further wherein said $Au_{25}(SC_2H_4Ph)_{18}$ is neutrally charged $Au_{25}(SC_2H_4Ph)_{18}$.

5. The method of claim 1 wherein said photophysical process contains at least as much energy as HOMO-LUMO gap energy of said $Au_{25}$ adsorbate.

6. The method of claim 5 wherein said photophysical process comprises a wavelength of equal to or greater than 550 nm.

7. The method of claim 5 wherein said photophysical process comprises a wavelength of equal to or less than 680 nm.

8. The method of claim 5 wherein said HOMO-LUMO gap energy is 1.35 eV.

9. The method of claim 1 wherein said electron accepting molecule is $O_2$, CO, Quinoline, $K_3Fe(CN)_6$, $Ce(SO)_4$, oxoammonium cations, peroxide species, and combinations thereof.

10. The method of claim 1, wherein said exposure of said combination to said photophysical process occurs in a solution comprising oxygen.

11. The method of claim 1, wherein said inorganic salt is tetrabutylammonium perchlorate, tetrabutylammonium hexafluorophosphate, tetrabutylammonium tetrafluoroborate, and combinations thereof.

12. The method of claim 1 further comprising a catalyst support having the $Au_{25}^+$ deposited thereon.

13. The method of claim 12, wherein catalyst support is selected from the group comprising aluminum oxides, zeolites, and activated carbons.

14. A method of making an $Au_{25}^+$ catalyst using the method of claim 1 further comprising depositing said $Au_{25}^+$ onto a catalyst support.

15. The method of claim 14, wherein said catalyst support is from the group comprising aluminum oxides, zeolites, and activated carbons.

16. A method of making an $Au_{25}^+$ electrode using the method of claim 14.

17. A method of making an $Au_{25}^0$ catalyst using the method of claim 1 further comprising depositing said $Au_{25}^0$ onto a catalyst support.

18. A method of making an $Au_{25}^0$ electrode using the method of claim 17.

19. A method for oxidization of a ligand protected $Au_{25}$ adsorbate comprising:
- combining said $Au_{25}$ adsorbate with an electron accepting molecule and an excess amount of counter ion comprising an inorganic salt;
- a catalyst support selected from a group comprising aluminum oxides, zeolites, and activated carbons, and having the $Au_{25}^+$ deposited thereon; and
- exposing at least said combination to a photophysical process containing at least as much energy as HOMO-LUMO gap energy of said $Au_{25}$ adsorbate having a wavelength of equal to or greater than 550 nm but less than or equal to 680 nm in order to achieve an $Au_{25}$ adsorbate with an +1 tunable ground state charge of ($Au_{25}^+$).

* * * * *